United States Patent [19]
Wilson

[11] 4,395,918
[45] Aug. 2, 1983

[54] FLOW RATE METER

[76] Inventor: S. Kirby Wilson, 747 Progress La., Ramona, Calif. 92065

[21] Appl. No.: 156,554

[22] Filed: Jun. 5, 1980

[51] Int. Cl.³ ............................................ G01F 13/00
[52] U.S. Cl. ...................................... 73/861; 73/223
[58] Field of Search ................. 73/3, 223, 224, 294, 73/861

[56] References Cited

U.S. PATENT DOCUMENTS

| | | | |
|---|---|---|---|
| 1,033,173 | 7/1912 | Hoaglin | 73/294 |
| 2,325,695 | 8/1943 | McAfee | 73/223 X |
| 2,490,627 | 12/1949 | Hofberg | 73/223 X |
| 2,938,380 | 5/1960 | Smith et al. | 73/224 X |
| 3,125,881 | 3/1964 | Peters et al. | 73/223 |
| 3,271,993 | 9/1966 | Whitson | 73/3 |
| 3,930,411 | 1/1976 | Beeker et al. | 73/224 |

FOREIGN PATENT DOCUMENTS

| | | | |
|---|---|---|---|
| 1525713 | 9/1978 | United Kingdom | 73/3 |
| 214117 | 3/1968 | U.S.S.R. | 73/3 |

Primary Examiner—Herbert Goldstein
Attorney, Agent, or Firm—Thomas J. Tighe

[57] ABSTRACT

A device for determining the flow rate of a liquid flowing from an open discharge. The liquid is directed into a bucket with a first sensor located low in the bucket and second sensor located high in the bucket. The volume of the bucket between the sensors is known. The first and second sensors when in contact with the liquid start and stop an electronic timer respectively. The flow rate is determined by dividing the time measured into the known volume. In the preferred embodiment, the calculations are performed electronically and the results display on a digital liquid crystal display.

4 Claims, 2 Drawing Figures

FLOW RATE METER

BACKGROUND OF THE INVENTION

This invention generally relates to methods and apparatuses for measuring the rate of flow of a free flowing fluid, and more specifically to methods and apparatuses for measuring the rate of flow of effluents from an open discharge such as water flowing from an artesian well.

The impetus for the development of this invention was the set of problems associated with measuring the water yield from artesian wells. When drilling such wells with air drilling machines, the air blows the cuttings and any water the well produces out of the well. Periodically the drilling is stopped in order to measure the water yield and the effluent water is channeled into a single stream, typically through a short pipe. A bucket with a volume of several gallons and calibrated is then placed at the end of the pipe to receive the water. The length of time required to fill the bucket is measured with a stop watch. The flow rate of the water in gallons per minute is calculated by dividing the time registered on the stop watch into the capacity of the bucket and multiplying by a scale factor if necessary to adjust the dimensions of the result to gallons/minute.

The foregoing described procedure is simple but invariably a drilling crew will loose the stop watch, have no pencil and paper, or have no inclination to use them. This results in the time being approximated, the division being approximated and the flow rate being inaccurately determined.

Bucket size is also a problem. A one gallon bucket receiving water at a flow rate of 60 gallons per minute will be filled in one second. Even with a stop watch, human reaction times are too slow to obtain reasonable accuracy under such conditions, and therefore a much larger bucket must be used. With an electronic system used to measure time, bucket fill times of much less than a second can be accurately measured, and the size of the bucket used can be significantly reduced. Moreover, an electronic system can provide a degree of accuracy unobtainable by any manual techniques.

An electronic system can also provide the means for calculating the flow rate and displaying same so that the operator need not perform any calculations. Furthermore, since long term data storage is not a problem in a digital electronic system, flow rates from various measurements can be stored until it is convenient to record them with a pencil and paper.

No prior apparatus known to me provides the combination of attributes which are presented by and are inherently a part of this invention.

SUMMARY OF THE INVENTION

This invention has a volume means, such as a bucket, with two sensors disposed within the bucket. The sensors are adapted to generate an electrical signal when they are in contact with a liquid. One sensor is positioned low in the bucket and one is positioned high in the bucket. The volume capacity of the bucket between the locations of the two sensors is known. This invention also has an electronic timer which is started by the low sensor and stopped by the high sensor. The bucket, when empty, is positioned to receive fluid flowing from an open discharge, a liquid effluent. When the bucket is filled to a point up to or beyond the location of the high sensor, the flow rate of the liquid effluent is calculated by dividing the time, measured by the electronic timer, into the known volume. In the preferred embodiment, the calculations are performed by electronic circuits and the results are displayed on a digital display unit.

It is an object of this invention to provide a simple but yet very accurate means for determining the time taken to fill a known volume with a liquid effluent.

It is a further object to provide a means for electronically calculating and displaying the flow rate of the liquid effluent automatically.

It is a further object to provide a means for storing the flow rate data for a later, more conventint recording of same.

Other objects and advantages of the present invention will become readily apparent from the following description of the disclosed illustrative embodiment and drawings thereof.

DESCRIPTION OF THE PREFERRED EMBODIMENT

Figure 1:
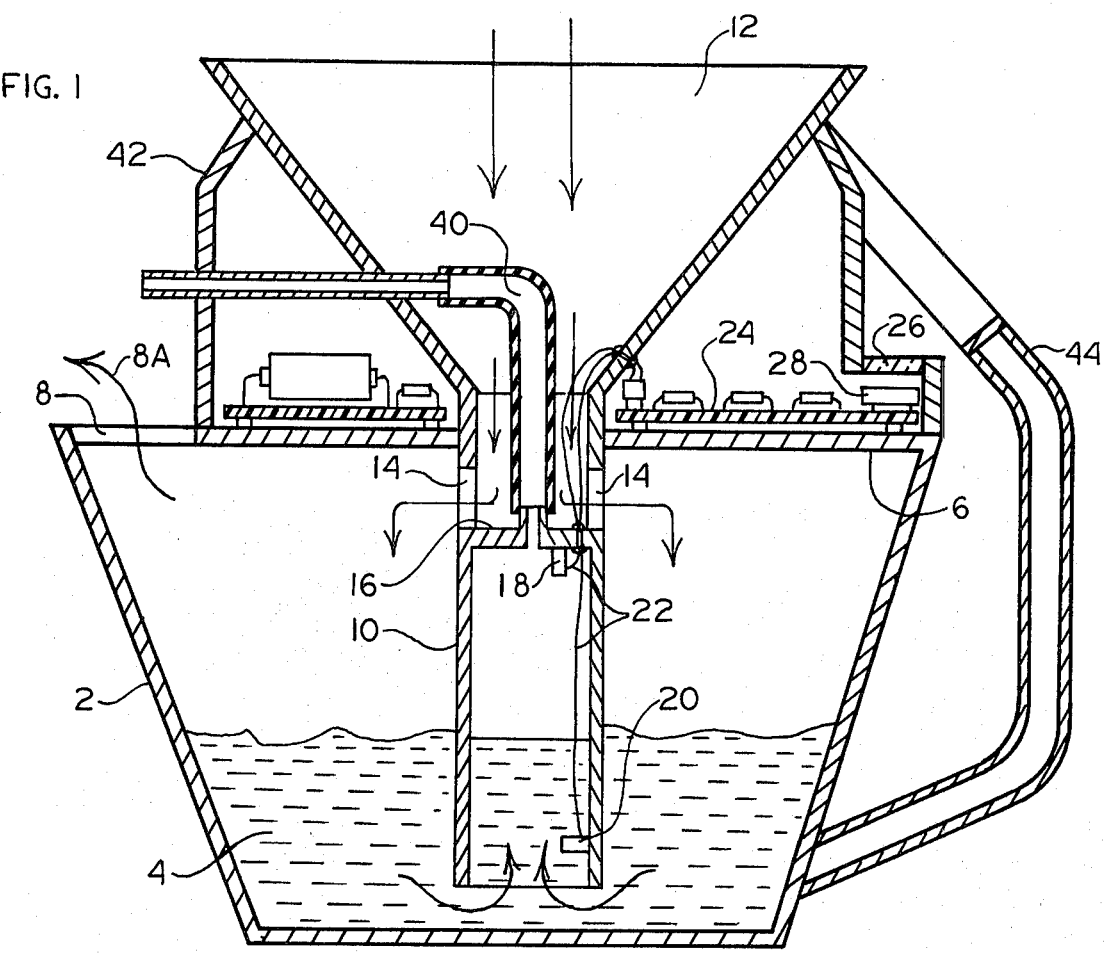
FIG. 1 is cross-sectional view of the flow rate meter taken through the center and dividing it into two symmetrical halves.

Referring to FIG. 1, a bucket, generally designated 2, is shown partially filled with a liquid 4. The bucket 2 has a cover 6 which defines a pour spout opening 8 through which the liquid passes when the bucket is being emptied as indicated by the arrow 8A. Extending through the approximate center of the cover 6 and into the bucket is an *equalizer tube* 10, and attached to the top of the equalizer tube 10 is a funnel 12. The funnel 12 collects the liquid effluent and directs it into the equalizer tube 10. At an appropriate point below the cover 6, the equalizer tube 10 has several side openings 14. When the liquid is being directed into the equalizer tube by the funnel it is also being deflected out of the equalizer tube through the side openings 14 by a deflector 16. The downward pointing arrows show the path of the liquid into the funnel, into the equalizer tube, and out of the tube to fill the bucket.

Disposed within the equalizer tube are two sensors, a high sensor 18 and a low sensor 20. The sensors are adapted to generate an electrical signal when they are in contact with a liquid. The sensors are in electrical communication with a printed circuit board 24 by means of wires 22. The printed circuit board 24 provides a surface for mounting and a means for electrically interconnecting batteries, the components of a circuit which will be discussed in a later paragraph and a digital display unit 28. The printed circuit board 24 is mounted on the cover 6 by means of stand-off's and is adapted to fit around the equalizer tube 10. A protective wall 42 is used to protect the electrical and electronic components of the invention from the liquid, dirt, dust and other harmful foreign objects. A window 26 is part of the wall 42 but is transparent to allow the operator of this invention to view the digital display unit 28.

To complete the description of FIG. 1, a conduit 40 provides fluid communication between the volume in the equalizer tube 10 below the deflector 16 and the external environment. The conduit 40 allows gases, which are trapped below the deflector 16 by the rising liquid, to escape to the external environment. A handle 44 provides a means for conveniently transporting the invention. The handle 44 is adapted to allow viewing of the window 26.

One type of sensor would employ two spaced apart electrodes with a difference of electrical potential applied between them. There would be no electrical current between the two electrodes until a current conducting liquid, such as water, was introduced between the electrodes. The electrical signal generated by this type of sensor would simply be the existence of some measurable amount of current beyond a predetermined threshold level between the electrodes. Another type of sensor would also employ two spaced apart electrodes but with a fixed air gap between them and a predetermined electrical capacitance based on the air gap. When a liquid is introduced into the air gap, the capacitance of the electrodes changes because of the difference in dielectric constant between air and the liquid. The electrical signal in the second type sensor would be the change in capacitance which can be readily detected by well known circuits. The sensors used in this embodiment are of the first type.

Figure 2:
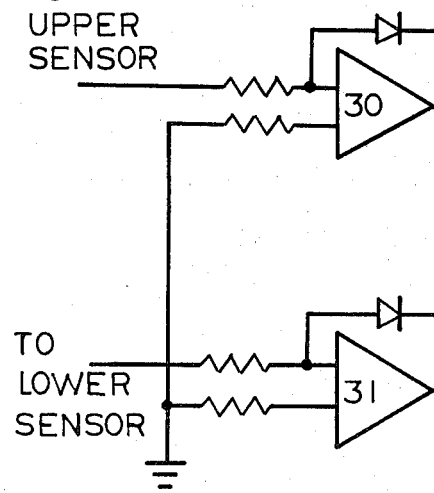
FIG. 2 is a schematical representation of the electronic circuits in the flow rate meter.

Referring to FIG. 2, the electronic system of this invention is shown. A first amplifier 31 is used to detect and amplify the electrical signal from the low sensor 20 and a second amplifier 30 is used to detect and amplify the electrical signal from the high sensor 18. The output of the first amplifier 31 is a digital signal which causes the digital timer 32 to start counting from a preset state. The output of the second amplifier 30 is a digital signal which causes the digital timer 32 to stop counting. The output of the timer 32 is a binary number which is divided into a constant, which represents the known volume of the bucket between the levels of the low and high sensors, by a digital divider 36. Floating decimal point and leading zero shifting are performed by the circuit 36 using well known techniques. Data storage and the decoding of the data from binary form to display format are performed by a storage and decoder circuit 38, and the properly formatted data is displayed by the display unit 28. The preferred embodiment combines the functions of the digital timer 32, digital divider 34 and floating decimal point and shifting 36 into a single microprocessor. Since the system is powered by batteries, a CMOS microprocessor is preferrable because of the inherent low power requirements of CMOS solid state devices. The display unit 28 is preferably a low power segmented liquid crystal device of the sort used in digital clocks and digital watches.

The function of the equalizer tube is to prevent false starting and stopping of the timer which would be caused by drops of the liquid splashing onto the sensors. The liquid as it flows from the funnel is deflected away from the sensors by the deflector. Furthermore, splashing caused by the falling liquid is prevented from contacting the sensors by the walls of the tube. The liquid is allowed to enter the portion of the tube where the sensors are located only from the bottom, as indicated by the upward pointing arrows. The tube in effect filters out the turbulence of the liquid.

The foregoing detailed description is given primarily for clarity of understanding and no unnecessary limitations should be understood therefrom, because other modifications will be obvious to those skilled in the art and may be made without departing from the spirit of the invention or the scope of the appended claims.

I claim:

1. A device for determining the rate of flow of a liquid effluent from an open discharge comprising:
   (a) a volume means of known capacity adapted to receive and hold the liquid;
   (b) a funnel means;
   (c) an equalizer tube, partially disposed within the volume means, with an upper and a lower portion, the upper portion defining a plurality of side openings and being adapted to receive the effluent from the funnel means and discharge the effluent into the volume means through the side openings, the lower portion being isolated from the upper portion by a deflector means and being adapted to receive the effluent such that the level of effluent in the equalizer tube is the same as the mean level of effluent in the volume means;
   (d) an outlet means for equalizing the gaseous pressure within the lower portion of the equalizer tube to the ambient pressure;
   (e) a first sensor means disposed within the lower portion of the equalizer tube and operative to produce an electrical signal when the effluent is first introduced into the volume means;
   (f) a second sensor means disposed within the lower portion of the equalizer tube and operative to produce an electrical signal when the effluent has completely filled the volume means;
   (g) a timer means to determine the time interval between the first sensor signal and the second sensor signal.

2. The device of claim 1 and in addition an electronic means for receiving the time interval information and calculating a flow rate of the liquid effluent in terms of volume units per time units, and a display means for displaying the flow rate.

3. The device of claim 2 wherein the electronic calculating means is a microprocessor.

4. the device of claims 1, 2, or 3 wherein the display means is a liquid crystal display unit.

* * * * *